(12) United States Patent
Beardmore et al.

(10) Patent No.: US 11,015,027 B2
(45) Date of Patent: May 25, 2021

(54) PROCESS FOR MANUFACTURING PRODUCTS FROM ACETYLATED WOOD FIBRE

(71) Applicant: Medite Europe Limited, Clonmel (IE)

(72) Inventors: Pat Beardmore, Clonmel (IE); Tom Prendergast, Clonmel (IE)

(73) Assignee: Medite Europe Limited, Clonmel (IE)

( * ) Notice: Subject to any disclaimer, the term of this patent is extended or adjusted under 35 U.S.C. 154(b) by 0 days.

(21) Appl. No.: 14/770,135

(22) PCT Filed: Feb. 20, 2014

(86) PCT No.: PCT/EP2014/053306
§ 371 (c)(1),
(2) Date: Aug. 25, 2015

(87) PCT Pub. No.: WO2014/131683
PCT Pub. Date: Sep. 4, 2014

(65) Prior Publication Data
US 2016/0002414 A1    Jan. 7, 2016

(30) Foreign Application Priority Data

Feb. 26, 2013 (GB) .................................... 1303350

(51) Int. Cl.
*C08H 8/00* (2010.01)
*B27N 3/04* (2006.01)
*C08L 97/02* (2006.01)

(52) U.S. Cl.
CPC ................. *C08H 8/00* (2013.01); *B27N 3/04* (2013.01); *C08L 97/02* (2013.01)

(58) Field of Classification Search
CPC .................................. C08H 8/00; C08L 97/02
See application file for complete search history.

(56) References Cited

U.S. PATENT DOCUMENTS

| | | | |
|---|---|---|---|
| 5,431,868 A * | 7/1995 | Hirano | B27N 1/006 264/109 |
| 5,525,721 A * | 6/1996 | Ohshima | C08H 8/00 536/69 |
| 6,376,582 B1 | 4/2002 | Iwata et al. | 524/14 |

(Continued)

FOREIGN PATENT DOCUMENTS

| | | | | |
|---|---|---|---|---|
| DE | 10012427 | 11/2000 | | B27N 3/00 |
| JP | 7-88813 | 4/1995 | | B27N 3/02 |
| WO | WO 2011/095824 | 8/2011 | | C08L 97/02 |

OTHER PUBLICATIONS

Labosky et al. (Forest Products Journal, 43(Nov. 2012), 1993, 82).*

(Continued)

*Primary Examiner* — Liam J Heincer
(74) *Attorney, Agent, or Firm* — Kusner & Jaffe

(57) ABSTRACT

A process for forming wood fibre comprising breaking down acetylated wood to produce acetylated wood fibre having a moisture content from about 5% w/w to about 8.5% w/w after it is comminuted to form wood fibre. The process includes a first moisture-introducing step for increasing the moisture content of the acetylated wood elements; and a second moisture-introducing step, separate to the first, for increasing the moisture content of the acetylated wood elements.

17 Claims, 3 Drawing Sheets

(56) References Cited

U.S. PATENT DOCUMENTS

| | | | | |
|---|---|---|---|---|
| 6,632,326 B1* | 10/2003 | Hirano | | B27N 1/00 156/62.4 |
| 6,702,969 B2* | 3/2004 | Matuana | | B27N 3/00 264/109 |
| 2007/0128422 A1* | 6/2007 | Nasheri | | B27K 3/0271 428/292.4 |
| 2011/0045268 A1* | 2/2011 | Girotra | | B27K 3/346 428/220 |
| 2013/0209822 A1* | 8/2013 | Maes | | C08G 18/6492 428/541 |
| 2013/0303751 A1* | 11/2013 | Rowell | | D21B 1/06 536/120 |
| 2014/0065340 A1* | 3/2014 | Allen | | B27K 1/00 428/44 |
| 2014/0227503 A1* | 8/2014 | Pol | | B27N 1/006 428/220 |
| 2014/0311693 A1* | 10/2014 | Painter | | C08H 8/00 162/76 |
| 2015/0050483 A1* | 2/2015 | Pol | | B27K 3/08 428/220 |
| 2015/0051384 A1* | 2/2015 | Alexander | | B27K 5/003 530/504 |
| 2015/0051386 A1* | 2/2015 | Pol | | C08H 8/00 530/507 |
| 2016/0002415 A1* | 1/2016 | Beardmore | | B27N 3/04 162/157.6 |
| 2016/0122440 A1* | 5/2016 | Besemer | | C08B 3/06 536/69 |

OTHER PUBLICATIONS

International Search Report from corresponding International Patent Application No. PCT/EP2014/053306, dated Jul. 7, 2014.
Mohebby et al., "Water Repellent Effect of the Acetylation on Poplar Fibres," Wood Modification: Processes, Properties and Commercialization, Jan. 1, 2005, p. 139, paragraoh 4 figure 3.
Rowell et al., "Dimensional Stability of Aspen Fiberboard Made from Acetylated Fiber," Wood and Fiber Science, The Society, Lawrence, KS, US, vol. 23, No. 4, Jan. 1, 1991, pp. 558-566, p. 560, paragraph 3; table 1.
Simonson et al., "A New Process for the Continuous Acetylation of Lignocellulosic Fibre," Chalmers University of Technology, Department of Forest Products and Chemical Engineering, Goteborg, Sweden, pp. 190-196, Dec. 4, 2001.

* cited by examiner

PROCESS FOR MANUFACTURING PRODUCTS FROM ACETYLATED WOOD FIBRE

FIELD OF THE INVENTION

This invention relates to the field of wood processing. More specifically, it relates to processing acetylated wood fibre for use in manufacturing of products from the acetylated wood material including wood board manufacture such as wood fibreboard manufacturing.

BACKGROUND TO THE INVENTION

Boards constructed from wood such as wood fibreboards, for example medium density fibreboard (MDF) comprising wood fibres bound together with binder resin are superior in strength and are easily processed due to their homogeneity. Such wooden products including fibreboards can be used to obtain a variety of formed shapes. The shapes can be planar or flat in profile. Curved shapes are also easily formed. They are widely used as materials for furniture and for a variety of construction purposes.

In resin fibreboards such as MDI (methylene diphenyl diisocyanate) resin type fibreboards such as MDF, in which the wood fibres are bonded together by means of MDI; the dimensional stability variations due to the hygroscopicity (water retaining property) of the material and water absorption are great. The fibreboard such as MDF can also be subject to biological decay.

Chemical modification of wood for improved dimensional stability and biological decay protection has been the subject of research for many years. Acetylation is one such method that has been well researched and documented. In the acetylation process, in order to make effective use of expensive acetic anhydride and to prevent it reacting with moisture in the wood, the wood may be dried to obtain a low moisture content, typically a content of less than about 3%. During acetylation, the chemical reaction of the acetic anhydride substitutes the hydroxyl groups in the wood cells with acetyl groups. This has the effect of bulking out the walls of the wood cells and preventing moisture uptake, and hence gives the treated wood a level of hydrophobicity (resistance to water intake) and dimensional stability much greater than that of non-acetylated wood. The resulting acetylated wood has low moisture content and enhanced resistance to biological decay.

Unprocessed green wood may have a moisture content of greater than 50%. When manufacturing wood fibreboard such as MDF, the manufacturing process normally involves reducing the moisture content of the green wood by mechanical compressing of wood chips and subsequent softening of the wood chip by heating with steam. This aids the extraction of the fibre for further processing into wood fibreboard. As wood is an excellent insulator of heat, the wood chip requires a high moisture content to allow an efficient thermal heat transfer into its core to enable the softening of the chip to take place.

A thermo-mechanical defibration or refining process is generally performed to breakdown the softened chip into fibre. The results of the process are dependent on variations in the moisture content of the wood, the heat applied to the wood chip and the point at which the wood constituents enters their glass transition phases (i.e. the transition from a hard and relatively brittle state into a softened or rubber like state).

Further conversion of the fibres into MDF is influenced by the fibre quality, density and moisture content.

In acetylated wood fibreboard manufacturing, the acetylated wood chip is low in moisture content (approx. 7% moisture content) has a higher density that non-acetylated wood chip and exhibits high levels of hydrophobicity. Unlike MDF processing using non-acetylated wood, processing of such a dry wood chip requires the introduction of moisture into the chip rather than a reduction of moisture in the chip. Furthermore, the temperature/moisture conditions necessary to achieve the glass transition conditions for the thermo mechanical conversion chip into fibre must be established.

Moisture plays an integral part in the composition of wood fibre in the manufacture of MDF panels and other products. The moisture in the fibre performs a number of functions. It enables even heat distribution to be achieved in the forming press across the fibres, and is necessary to initiate the chemical bonding action with bonding resins used to fabricate wood products. Thus, producing a wood fibre within a desired moisture range which allowed for the production of acetylated and non acetylated wood products on the same production line would provide significant advantages.

Internal voids are formed in an MDF fibreboard when the heat produced in the forming press causes the moisture to evaporate at a rate in the forming process which precludes its escape through the surface of the board. Surface blemishes occur in the forming press when the moisture escapes through the surface of the board after the board has left the forming press. The primary factor in the formation of these defects arises from the actual moisture content of the wood fibre at the start of the process. Other factors which influence the formation of the defects lie in the temperature, speed and pressure conditions experienced by the panel in the forming press. While these can influence the formation of the defects, moisture content is the major contributor.

As such, the controlled introduction of moisture is of critical importance in the fibreboard manufacturing process and improvements in the methods of moisture introduction would lead to higher quality wood fibres with resultant benefits found in products made from those fibres.

In MDF wood fibreboard manufacturing using non-acetylated wood, there is a risk of explosion associated with the possible ignition of a dry wood dust atmosphere. Much of this risk is mitigated by the relatively high moisture content state of the wood chips. However, in acetylated wood fibreboard manufacturing the risk of explosion is much greater due to the low moisture content of the wood elements, the high levels of hydrophobicity of the wood element and the associated generation of large amounts of dry dust. This is a significant issue to be overcome.

The capital cost of a plant in MDF wood fibreboard manufacturing is very high. In order to commercialise acetylated wood fibreboard manufacturing, the acetylated wood elements should ideally be processed on the same plant as the non-acetylated wood fibreboard. Yet the differences in characteristics of non-acetylated and acetylated wood elements are significant and present particular challenges in getting the processing equipment to function effectively for both sets of wood elements. Changes in the processing techniques used to successfully process non-acetylated wood elements would be required to successfully process acetylated wood elements. The changes must be activatable and deactivable or reversible, as the plant must accommodate both sets of wood elements.

There is a need for improvements to the process of manufacturing wood fibreboard comprising wood fibres bound together with a binder resin that will allow acetylated wood fibreboard to be manufactured on the same plant as non-acetylated wood fibreboard.

Much of the prior art to date has been concerned with the acetylation process of the wood elements and whilst laboratory scale production of acetylated fibreboard has taken place there is little literature available on overcoming the difficulties in upscaling the laboratory production into full commercial production onto existing MDF plants. There is an absence of guidance on how to commercially condition the wood chip, how to avoid explosive risks, and little guidance on how to press the acetylated fibres into uniform panel thicknesses.

In the publication "A NEW PROCESS FOR THE CONTINUOUS ACETYLATION OF LIGNOCELLULOSIC FIBRE" by Rune Simonson and Roger M. Rowell, it is noted that the wood element is converted to fibre in green state prior to acetylation. Post acetylation, the acetylated fibre can be resinated for fibreboard production. There exists no further detail on how the process is executed. In U.S. Pat. No. 6,376,582, "WOOD FIBREBOARD AND MANUFACTURING METHOD THEREFOR," reference is made to the manufacture of acetylated MDF using a mixture of acetylated and non-acetylated materials. No guidance is provided as to how the fibres are formed for MDF panel processing.

U.S. Pat. No. 6,632,326 MODIFYING METHODS FOR WOOD ELEMENTS discloses a process of acetylating wood by subjecting it to a gaseouse acetylating agent. The wood elements are then digested for 2-5 minutes under high-pressure steam at a temperature of around 150-170° C. Wood fibres are obtained by separation of the wood elements into fibres through a disk refiner. The experimental section is based on laboratory scale work and provides no teching on how to handle materials at a commercial scale. Furthermore the description provides little guidance on the hazards in processing excessively dry fibre. WO 2011/095824 A1 PROCESS FOR THE ACETYLATION OF WOOD ELEMENTS discloses a process of breaking down acetylated chip to fibre by passing through a conventional defibrator, combining with pMDI adhesive, and converting to composite panel or board by applying high temperature and pressure. No guidance is provided as to how the fibres are formed for MDF panel processing. The description provides no guidance on the hazards in processing excessively dry fibre.

SUMMARY OF THE INVENTION

The present invention provides for a process for forming wood fibre comprising breaking down acetylated wood to produce acetylated wood fibre having a moisture content from about 5% w/w to about 8.5% w/w after it is comminuted to form wood fibre.

The process provides the advantage of producing an acetylated wood fibre comprising a moisture content which results in enhanced strength and water resistance in wood products fabricated from the fibre. Furthermore, the process may be carried out in plants using machinery which is also suitable for the production of non-acetylated wood fibre.

Unlike prior art fibre where acetylated and non-acetylated wood fibre is mixed, the present invention does not include wood fibre where fibre from a non-acetylated source is mixed in with the acetylated wood fibre. The acetylated wood fibre has this moisture content and is suitable for being combined with a binding material such as resin to form a product such as a fibreboard.

The wood fibre of the process may be formed from breaking down pieces of wood such as wood chip.

The wood fibre may have a moisture content of about 5% w/w to about 8% w/w after it is comminuted to form wood fibre, for example from about 5.5 to about 7.5% w/w.

The wood fibre may have a moisture content of from about 6% to about 7% w/w after it is comminuted to form wood fibre. Desirably the acetylated wood fibre has a moisture content from about 6.5% to about 6.8% w/w.

The moisture content of the acetylated fibre makes it safer for handling. Furthermore products formed from the acetylated fibre are much less likely to suffer defects such as blistering and/or delamination.

Moisture plays an integral part in the composition of wood fibre in the manufacture of fibreboards such as MDF panels. The moisture in the fibre performs a number of functions. It enables even heat distribution to be achieved in the forming press across the fibres, and is necessary to initiate the chemical bonding action with the resin such as MDI resin.

Internal voids are formed in fibreboards such as an MDF panel when the heat applied in the forming press causes the moisture to evaporate at a rate in the forming process which precludes its escape through the surface of the product such as a board. Surface blemishes can thus occur in the product when the moisture escapes through the surface of the product after the product has left the forming press. The primary factor in the formation of these defects arises from the actual moisture content of the wood fibre as introduced into the forming press and thus at the start of the forming part of the process. Other factors which influence the formation of the defects lie in the temperature, speed and pressure conditions experienced by the panel in the forming press. While these can influence the formation of the defects, moisture content is the major contributor. Surface blemishes and internal voids can also occur through insufficient moisture. The mechanism causing the defects lies in the lack of moisture needed to initiate the resin (e.g. MDI) chemical bonding action or curing process occurring in the forming press.

Empirical data indicates that a fibre moisture content of 12% increases the incidence of internal voids and surface blemishes being formed in the pressing process in the manufacture of MDF to 98% to 100% of total production.

Within the process, the moisture content of the acetylated wood may be adjusted by adding moisture in more than one processing step.

The process may comprise a first moisture-introducing step for increasing the moisture content of the acetylated wood elements; and a second moisture-introducing step, separate to the first, for increasing the moisture content of the acetylated wood elements.

Introducing the moisture in this manner reduces the risk of explosion associated with processing of low moisture content wood elements such an acetylated wood. It further provides the advantage of preventing over-moisturising of the chip which will reduce the quality of the fibre produced and will thus have a further negative impact on the strength and durability characteristics of products produced from the fibre. Over-moisturising may even render the chip unsuitable for further processing.

The moisture may be introduced to the process in the form of water and in the form of steam.

A first moisture-introducing step may comprise introducing water, and introducing steam in order to heat the chip.

Steam may be introduced to the process at a temperature in the range of about 160° C. to about 190° C.

Steam may be introduced to the process at a temperature in the range of about 175° C. to about 185° C.

Steam may be to the process introduced at a temperature of about 180° C.

The second moisture-introducing step of the process may comprise introducing steam in order to heat the chip.

The second moisture-introducing step of the process may comprise introducing steam at a temperature in the range of about 170° C. to about 210° C.

The second moisture-introducing step of the process may comprise introducing steam at a temperature in the range of about 180° C. to about 200° C.

The second moisture-introducing step of the process may comprise introducing steam at a temperature of about 190° C.

The acetylated wood of the process may be in the form of wood pieces such as wood chip and a first moisture-introducing step is performed in a receptacle containing the pieces of acetylated wood.

The receptacle may be a holding receptacle for feeding the acetylated wood for further processing.

The receptacle may be a surge control receptacle such as a surge bin for consistent feeding of the acetylated wood for further processing.

This provides the advantage of a continuous flow of material though the process.

Inconsistent feeding of wood elements in the processing line may damage equipment. Lumped or bulky feeding can lead to clogging of equipment while feeding wood elements too thinly can also damage equipment.

In the process, the acetylated wood may be treated in a digester and moisture is added to the acetylated wood in the digester.

Moisture may be added to the acetylated wood in the digester in a second moisture-introducing step.

Each of the above steps allow for the controlled introduction of moisture which is of critical importance in the fibreboard manufacturing process. Controlled moisture introduction leads to higher quality wood fibres with resultant benefits, such as enhanced strength and durability found in products made from those fibres.

The invention further provides for a process for forming an article from an acetylated wood fibre formed by the process as described above. The wood fibre may be formed into an article by bonding the wood fibre using a suitable bonding agent such as a resin. The article may be a suitable fibreboard.

The invention further provides for a product such as a fibreboard produced from the process of the invention.

The acetylated wood may be passed through a compressive screw feeder such as a plug screw feeder before being treated in a digester.

The compressive screw feeder may be suitable for handling both acetylated and non-acetylated wood pieces, the screw feeder comprising: a housing for a screw element, the housing having an intake and an outlet, a rotatable screw element for rotating to compressively progress the wood pieces through the screw feeder from the intake to the outlet; wherein proximate the outlet, a compacting end of the screw is dimensioned to allow compressive progress of acetylated wood pieces so that acetylated wood pieces having a moisture content from about 3% to about 10% w/w exit the compressive screw feeder.

The screw element of the screw feeder may be adapted by changing the pitch of the screw element at the outlet end thereof so that the screw element has two different pitches.

Moisture may be added to the wood as it is fed to the screw feeder and/or as it passes through the screw feeder.

The acetylated wood may be passed through a screw feeder after being treated in a digester and before being refined in a refiner.

Moisture may be added to the wood as it is fed to the screw feeder and/or as it passes through the screw feeder.

The refining step may be performed by refining the acetylated wood between two discs comprising a fixed disc and a rotating disc separated by a gap.

The refining step may be performed in a pressurised chamber.

The present invention further provides for a process for forming an article from acetylated wood fibre, the process comprising taking acetylated wood fibre as described above or an acetylated wood fibre formed by the process as described above and forming the wood fibre into an article by bonding the wood fibre using a suitable bonding agent such as a resin.

The process may be for forming a suitable fibreboard.

The acetylated wood fibre may be formed by the process described above and may further comprise a drying step after the refining step.

A binder resin may be injected into the wood fibre during the drying step. The drying step may comprise passing the fibre through one or more heaters comprising an inlet and an outlet.

In the present invention the term "wood fibre(s)" as applied to materials for use in the production of articles made from wood fibre, does not include fibres naturally bound together within a piece of wood, instead it refers to the material obtained when wood has been broken down (by processing) into particulate matter. It can be considered comminuted wood material. Of particular interest in the present invention is particulate matter which is fibrous in nature and of a type suitable for use in the manufacture of a fibreboard such as MDF.

In the present invention reference is made to water and to steam. It will be appreciated by the skilled person that the two terms are used to differentiate between water (whether heated or not) in liquid form and water in its gaseous form. For example where water and steam are added it is clear that this means that liquid water and gaseous steam are both added.

DETAILED DESCRIPTION

The present invention will now be described with reference to the accompanying drawings.

Figure 1:
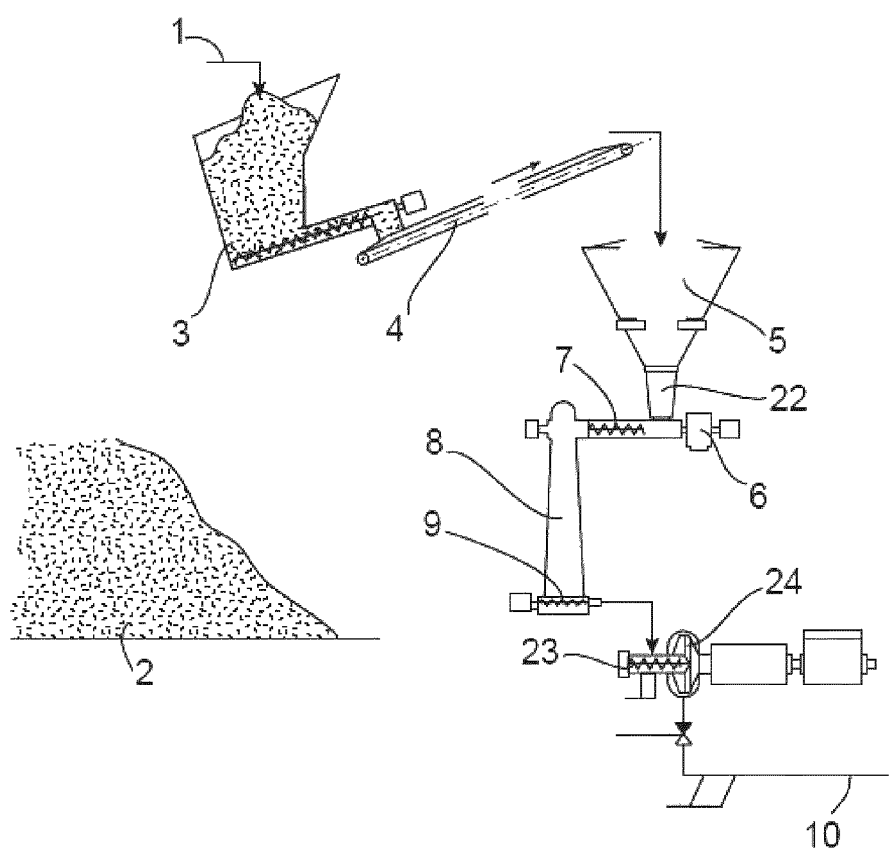
FIG. 1 shows a flow diagram of the process up the refiner stage including the moisture adding stages

FIG. 1 shows a typical plant set up suitable for the processing of wood fibreboard into fibreboard and for the formation of MDF from the fibre. The process has been modified to allow for the processing of acetylated wood chips into fibre and the formation of fibreboards from the fibre. The overall process for the formation of the fibreboards will be described below and the modifications from the typical MDF process to allow for the processing of acetylated wood elements will be highlighted.

Acetylated wood material is cut into chips 1 and is held in storage 2 until required for processing.

A variety of acetylated wood materials may be used. However, preferred sources for the starting material include aspen, radiata pine, lodge-pole pine, Japanese cedar, Japanese cypress, larch, white fir and spruce.

Acetylated wood pieces or elements are collected by an infeed hopper 3 and are conveyed along an infeed conveyor 4 into a surge bin 5. Preferably, elements are fed into the bin at a rate of about 20 m$^3$/hr. Preferably, the average size of the wood elements at this stage is about 25 mm×25 mm×6 mm. In order to sustain such a rate, the surge bin 5 preferably has a capacity of about 7 m$^3$. The surge bin 5 has the effect of changing an inconsistent flow of material into a controlled flow or a consistent flow.

Water is added to the chip 1 in the surge bin 5. Preferably, a mains water supply of about 10 l/min is added as chip enters the bin. Water may be added through a series of nozzles. In a preferred embodiment, water is added through four nozzles into the top of the surge bin. This has the effect of adding surface moisture and reducing the generation of dust. This is additional step compared to the processing of non-acetylated wood. Such a step is not necessary in non-acetylated wood element processing due to the higher moisture content of the non-acetylated wood. Steam at a pressure of 9 bar (0.9 MPa) is injected to the base of the surge bin at a rate preferably in a range from 1900 kg/h to 2200 kg/h, for example at about 2099 kg per hour. In a preferred embodiment, steam is added at a temperature of about 180° C. The steam may be added through nozzles at the base of the bin. In a preferred embodiment, steam is added through three nozzles positioned at 120° C. at about 300 mm from base of bin.

The throughput of chips is dependent on line speed at the board forming end of the process. i.e. it is dependent on how much volume of board per hour is to be produced. If the line speed is running at 10 m$^3$ per hour then the throughput of chips will be 10 m$^3$ per hour.

Steam is preferably added at a fairly constant rate. The line speed is preferably 10 m$^3$ per, with about a 10% variance. The rate of addition of steam would not be adjusted for this variance. This has the effect of heating the chip. The chip is heated in order to soften it.

Because of the low moisture content of acetylated chip, the time taken to heat the chip is longer compared to non-acetylated chip. As such, the steaming or heating step may be split and carried out in two locations. The first heating step may take place in the surge bin 5 as described above where the chip is heated to about 100° C. and the second occurs later in the process, in a digester 8 (as described below). This allows additional time to be added to the heating process without affecting plant throughput. In an embodiment with a 5 m$^3$ running capacity of the bin and a 10 m$^3$ per hour line speed, the chip will remain in the surge bin for about 30 minutes before being passed out of the bin.

After being partially heated in the surge bin 5, the acetylated wood chip 1 passes through a chute 22. In a preferred embodiment, the dimensions of chute are about 600 mm×600 mm. Water is added the chute at rate preferably in a range from 20 l/min to 30 l/min, for example at about 25 l/min to the chip 1. (The water is at the temperature of a mains water supply. At this point in the process, the volume of chip is line speed dependent, the size of the chip is the same as when it has left the surge bin as there has been no mechanical change other than to heat the chip). The water is added using two injection points on the chute 22. In a preferred embodiment, water is added from injection points at 500 mm from the base of the chute. This is an additional step compared to the processing of non-acetylated wood. A window is added to the area of the surge bin 5 which contains the partially steamed chip. Viewing the chip through this window allows the level of chip inserted to be monitored and verified. This aids process control by allowing blockages with the wetted, heated acetylated chip to be detected.

From the surge bin 5, the acetylated wood chip 1 passes through a modified plug screw feeder 6. The plug screw feeder is modified in the sense that it differs from a plug screw feeder normally used for the feeding of non-acetylated wood. The compacting area 7 of the screw is reduced compared to that of a feeder normally used with non-acetylated wood. This allows the acetylated wood chip to pass through this section of the process. The purpose of the plug screw in normal MDF manufacturing is to remove some of the moisture from the chip, to feed the chip into the digester 8, and to maintain a seal in the digester 8 which is at 9 bar (0.9 MPa) pressure. Acetylated chips are harder and much drier than non-acetylated chips, (starting moisture content of acetylated chip in the screw feeder is approx. 12% w/w while non-acetylated chips >50% w/w). The acetylated chip has less moisture and is more brittle and has a higher density than non-acetylated wood. A compromise is needed in the screw design to allow it work over this wide range of physical conditions of the chip (i.e. the allow the same plug screw to work with the dryer denser harder acetylated chip and the wetter, softer, lighter non acetylated chip). Reducing the compression at the end of the screw, while maintaining its compression characteristics over its length, allows for the final passage of acetylated wood through the screw feeder, and also allows effective compression of non acetylated wood elements when these are being processed at other times. The compromise design, i.e., the reduction in compression at the end of the screw can be achieved in accordance to the ratio L×0.1759 and D×0.734. For example a non acetylated wood screw of length L=2245 mm and whose end diameter D=150 mm over a length of 250 mm will have a new reduced end diameter D=110 over a length of 395 mm in an adaptation to an acetylated screw feeder. In a preferred embodiment, the overall dimensions of the plug screw feeder are about 3900 mm×420 mm. The plug feeder load is from 25-35% of maximum load, for example the plug feeder load is about 30% of its maximum load. In a preferred embodiment, the plug screw feeder is equipped with a 338 kW motor. The throughput of the plug screw feeder is limited to the line speed of the process. The maximum throughput of the plug screw feeder is 20 m$^3$ per hour on non acetylated chips. The maximum throughput, for acetylated chip is limited to line speed which is about 10 m$^3$ per hour. The plug feeder speed is preferably from 15% to 25% of its maximum, for example, the plug feeder speed is about 20% of maximum.

The acetylated wood chip 1 passes from the screw feeder 6 into a digester 8. The digester further softens the wood elements. The wood chip 1 is retained in the digester for 6 minutes. Steam at about 9 bar (0.9 MPa) is injected. In a preferred embodiment, steam is injected through four nozzles. Two nozzles are located on either side of the digester. In a preferred embodiment, steam at 190° C. is injected via continuous injection into the digester at a rate preferably in a range from 2750 to 3048 kg/h. For example steam is injected at a rate of about 2898 kg per hour. The temperature in the digester is maintained at about 182° C. This rate of steam injection is lower compared with non-acetylated wood element processing, where a rate of 5000 kg per hour may be expected.

Wood elements are discharged from the digester by way of internal discharge screw 9 at a rate dependent on the line speed. A-rotating action of the discharge screw transports the wood elements onto a defibrator feeder ribbon screw 23. Water is injected into the feeder ribbon screw 23 housing at a rate preferably in the range of 25 l/min to 35 l/min, for example water is injected at a rate of 30 l/min. In a preferred embodiment, water is injected through two nozzles on either side of the screw at about 450 mm from the entry point to the screw. The water injection is continuous for as long as the line is running. The injected water has a temperature preferably in a range of 50° C. to 98° C., for example at a temperature of 90° C. The chip 1 is feed via the feeder ribbon screw 23 into a low energy plate refiner 24.

The addition of the hot water into the refiner in the manner described above is necessary to achieve the correct balance between moisture content and heat content of the acetylated chip in order to maintain the glass transition phase of the wood element. By contrast, no injection of water is necessary in the processing of non-acetylated wood elements as the chip arrives at the refiner 24 with the correct combination of moisture/temperature to maintain the glass transition state. The glass transition point is not a fixed defined point. The process deals with a natural wood which by its nature is not uniform in its makeup and consistency. So the quality of the fibre produced in the refiner will indicate that the glass transition point has been achieved.

After being fed by the ribbon screw feeder 23 into the refiner 24, the chip 1 is retained in the refiner 24. The rate of feeding into the refiner is again line speed dependent. A differential pressure in a range preferably from 0.0063 to 0.0103 bar (630 Pa-1030 Pa) is maintained in the refiner, for example a differential pressure of about 0.0083 bar (830 Pa) is maintained. The refiner blow valve position is held at 22% of full opening. The incoming pressure into the refiner comes from the pressure in the digester at about 9 bar (0.9 MPa). As such, the refiner is essentially at a 9 bar pressure. The blow valve is used to regulate the flow of material through the refiner. The differential pressure is a means of controlling this flow. For example for wood fibreboard, with the blow valve opened at 56% of full opening, not a lot of back pressure is maintained as the material exits the refiner, so the difference in incoming pressure from the digester and the refiner pressure, i.e. the differential pressure, is 0.1712 bar (17 KPa) (9 bar (0.9 MPa) in the digester and 8.8288 bar (0.882 MPa) in the actual refiner).

For acetylated wood, the blow valve is shut down to 22% of full opening. This results in the incoming pressure from the digester being maintained in the refiner, hence the 'differential pressure' is reduced to 0.0083 bar (830 Pa). This differential pressure measurement indicates a retention time within the refiner which correlates to an amount of time the wood is in the refiner being transformed into fibre. If it is in the refiner for too long a time, the wood fibre turns to fines or dust which cannot be used in mdf. If it is in the refiner for too short a time it is not refined enough and shives are produced which cannot be used to make mdf. In a preferred embodiment, the refiner consists of two discs, one fixed, the other rotating at about 1490 rpm. The discs have a gap of about 14 mm. Chip slurry enters through the centre of the refiner similar to a centrifugal pump and travels to outside of the disc. During this route it gets rubbed and cut which changes the chip into a fibre. The diameter of the discs are approx 1.5 m, so for a 10 m3 per hour line speed and a rpm of 1490, a gap of 14 mm, the retention time in the refiner will be about 0.115 secs. Again the retention time is fine tuned by the plate gap, and a discharge valve. What ultimately drives the fine tuning is the 'quality' of fibre on the forming line. Again, the process deals with a natural chip which is inconsistent, hence the range of parameters. The fibre size is measured by sieving the wood elements through meshes with different opening sizes. As such, 'good quality' board could be expected to be produced with approx. the following fibre sizes: 0%>4 mm mesh size, 2%>2 mm, 8%>1.25 mm, 15%>0.8 mm, 18%>0.5 mm, 20%>0.25 mm, 20%>0.125 mm and 17%<0.125 mm.

Other refiner 24 operating conditions may be set as follows: the refiner feed screw speed preferably operates in a range from 28 to 48% of maximum for example the feed screw speed may be about 38% of maximum. The refiner feed screw load is preferably in a range from 18 to 28% of maximum, for example the feed screw load may be about 23% of maximum. The feed screw speed is not a set condition, as it is line speed dependent eg if line speed drops to 5 m³ p/h the feed screw will also drop to this amount. The refiner plate position is preferably in a range from 13 mm to 17 mm, for example the refiner plate position may be about 15 mm. The chamber hydraulic pressure is preferably in a range from 10 to 14 bar (0.1 to 1.4 MPa), for example, the pressure may be about 12 bar (1.2 MPa). The refiner main drive power is preferably in a range from 539 kw/h to 739 kw/h, for example, the drive power may be 639kw/h. In a preferred embodiment, the refiner motor is sized to be about 3150 kw. The refiner efficiency is preferably in a range from 79 kW/t to 99kW/t, for example the efficiency may be 89 kW/t.

Figure 2:
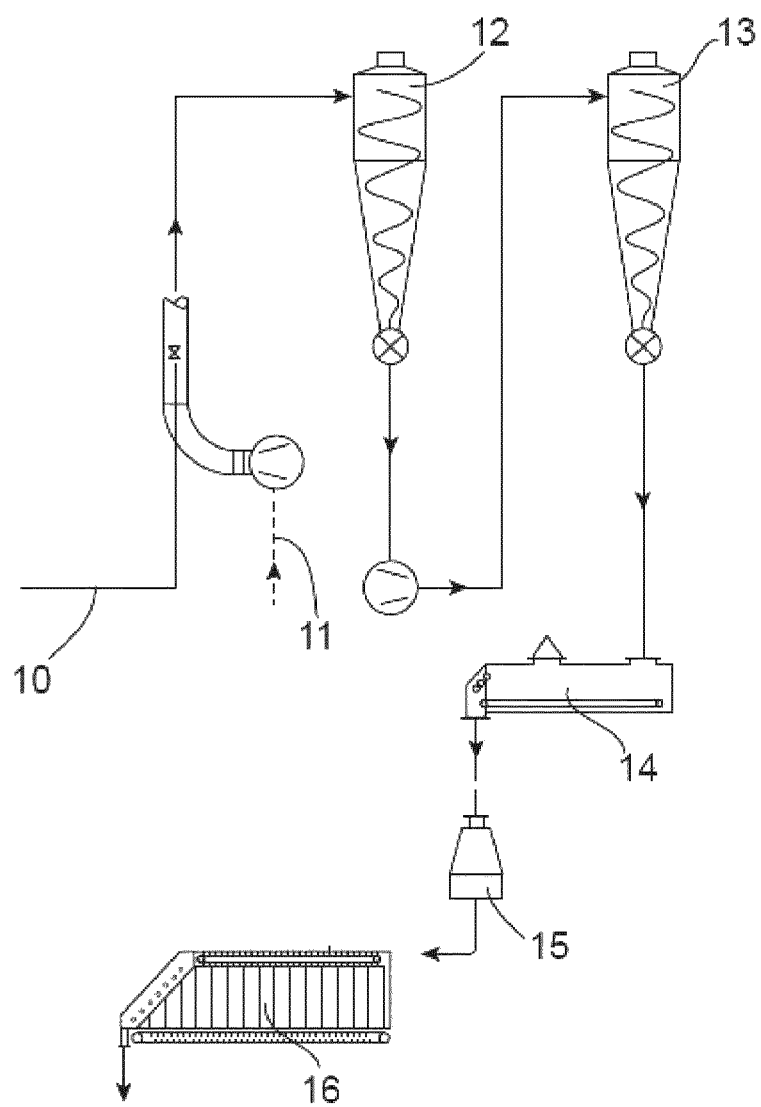
FIG. 2 shows a flow diagram of the heating stages of the process

The fibres from the refiner are passed through a blow valve 10 and further through a blow line to a stage 1 dryer 12 (FIG. 2). The rate of passage or volume of fibre passed is line speed dependent. In a preferred embodiment, the diameter of the blow line is about 100 mm. The acetylated wood fibres 1 from the refiner 8 are coated with a binder resin such as methylene diphenyl diisocyanate (MDI). The binder resin at 6% w/w is injected into the blow line 10 from the refiner 24 to the Stage 1 Dryer 12. In a preferred embodiment, the resin is injected in a continuous flow via a single point injection. The injection in the preferred embodiment is through a nozzle about 1.5 m from the exit of refiner. In addition, curing agents, curing catalysts, curing accelerators, diluents, thickeners, adhesive compounds, dispersing agents, and water repelling agents may be added to the binder resin as needed.

By comparison, for a wood fibreboard process, binder resin is injected into the blow line at 4% w/w. In order to prevent the moisture in the acetylated fibre reducing to dangerous levels and thus risking an explosion, flue gas dampers may be closed on the stage 1 dryer 12. A stack on dryer stage 1 may also be opened fully to reduce the temperatures in the dryer.

The Stage 1 Dryer 12 inlet temperature is controlled preferably at a temperature in a range from 84° C. to 104° C., for example the temperature may be controlled at about 94° C. The Stage 1 outlet temperature is controlled preferably at a temperature in a range from 45° C. to 65° C., for example the temperature may be controlled at about 55° C. The moisture content of the acetylated fibre exiting the Stage 1 Dryer 12 is about 11% w/w. The fibre is dried until its moisture content is measured to be about 11% w/w.

The acetylated fibre continues from the stage 1 dryer 12 to Stage 2 Dryer 13. The Stage 2 Dryer 13 inlet temperature is controlled preferably at a temperature in a range from 52° C. to 72° C., for example the temperature may be controlled at about 62° C. The Stage 2 dryer 13 outlet temperature is controlled preferably at a temperature in a range from 28° C. to 48° C., for example the temperature may be controlled at about 38° C. The moisture content of the acetylated fibre exiting the Stage 2 Dryer 13 is about 8% w/w. The fibre is dried until its moisture content is measured to be about 8% w/w.

Experimental

Moisture plays an integral part in the composition of wood fibre in the manufacture of fibreboards such as MDF panels. The moisture in the fibre performs a number of functions. It enables even heat distribution to be achieved in the forming press across the fibres, and is necessary to initiate the chemical bonding action with the MDI resin. Internal voids are formed in an MDF panel when the heat produced in the forming press causes the moisture to evaporate at a rate in the forming process which precludes its escape through the surface of the board. Surface blemishes occur in the forming press when the moisture escapes through the surface of the board after the board has left the forming press. The primary factor in the formation of these defects arises from the actual moisture content of the wood fibre at the start of the process. Other factors which influence the formation of the defects lie in the temperature, speed and pressure conditions experienced by the panel in the forming press. While these can influence the formation of the defects, moisture content is the major contributor. Surface blemishes and internal voids can also occur through insufficient moisture. The mechanism causing the defects lies in the lack of moisture needed to initiate the MDI chemical bonding action or curing process occurring in the forming press.

Empirical data indicates that a fibre moisture content of 12% increases the incidence of internal voids and surface blemishes being formed in the pressing process in the manufacture of MDF to 98% to 100% of total production.

Typical ingredient profile of the fibre entering the forming press would be:

Wood Fibre 80%, MDI resin 6%, Release Wax 2%, moisture 12%

Acetylated wood fibre has inherent characteristics which differentiate its reactive performance under wood fibre processing conditions. Its molecular structure has been altered by the substitution of some of the hydroxyl groups with acetyl groups, this substitution imparts a degree of hydrophobicity to the acetylated fibre elements. As a consequence of the molecular substitution the density of the fibre increases by about 20%.

Testing of the effects of different levels of moisture on defects levels were carried out according to the parameters below. In collating the results, each panel in 1220×2440 mm size format were passed under the Imal Ultrasonic detector. Any defect acknowledged by the detector would cause the board to be rejected. The results tabulated are percent rejected boards during each different fibre moisture set points test.

Fibre Composition

Acetylated Wood Fibre 80%, MDI resin 6%, Release Wax 2%, moisture varied

Forming press temperature 180° C.,
Forming Press pressure 18.7 kgf/cm$^2$
Defect Detection: Imal Ultrasonic blow blister detector.

Figure 3:
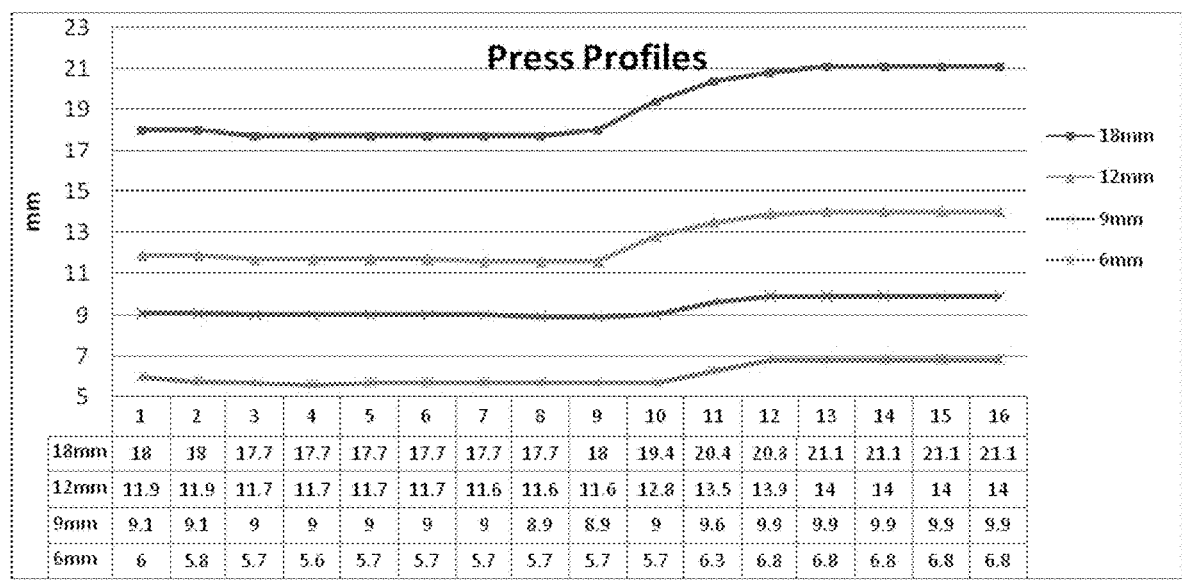
FIG. 3 shows the Forming Press Profile for four (4) sample boards of different thicknesses.

The Forming Press Profile for each of the sample boards is shown in FIG. 3.

Results:

Table I shows the percentage number boards rejected due to defects for a number of board thicknesses (6 to 18 mm) over for range of fibre moistures (3% to 12%).

For example, for a 9 mm thick board with 8% moisture content, 4.4% of boards are rejected.

TABLE I

|  | 12% | 9% | 8% | 7% | 6% | 5% | 4% | 3% |
| --- | --- | --- | --- | --- | --- | --- | --- | --- |
| 18 mm | 98% | 52% | 4.29 | 1.2 | 1.1 | 4.51 | 48.19 | 96.9 |
| 12 mm | 95% | 54% | 4.0% | 1.1% | 1.0% | 4.8% | 50% | 97% |
| 9 mm | 97% | 50% | 4.4% | 1.2% | 1.1% | 4.6% | 48% | 96% |
| 6 mm | 100% | 52% | 4.1% | 1.3% | 1.09% | 4.5% | 47% | 96% |

Table II shows the percentage number boards rejected due to defects for board thickness of 12 mm over for range of fibre moistures (5.5% to 7.5%).

For example, for a 12 mm thick board with 6.5% moisture content, 0.091% of boards are rejected.

TABLE II

|  | 7.5% | 7 | 6.8% | 6.5% | 6% | 5.5% |
| --- | --- | --- | --- | --- | --- | --- |
| 12 mm | 1.9% | 1.17% | 0.2% | 0.091% | 1.1% | 2.0% |

Conclusions

The first series of tests at different moisture levels on 4 different thicknesses of boards confirmed that the thickness of the board had little influence on the formation of defects within the board. Further testing at different moisture levels were thus confined to one thickness. Test data generated from this series of tests at different moisture levels suggest that at moisture level of 5.5% to 7.5%, the percentage reject panels decrease to 2%, while a moisture level in the range 6% to 7% will half this level of rejects. Ideally a range of 6.5% to 6.8% will minimise the formation of defects.

The words "comprises/comprising" and the words "having/including" when used herein with reference to the present invention are used to specify the presence of stated features, integers, steps or components but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Having described the invention, the following is claimed:

The invention claimed is:

1. A process for forming acetylated wood fibre to manufacture fibreboard, the process comprising:
   moisturizing acetylated wood, wherein moisturizing acetylated wood comprises:
   i) first wetting the acetylated wood by introducing moisture in water form and in steam form, the first wetting being carried out in a receptacle; and
   ii) after the first wetting, second introducing of moisture to the first wetted acetylated wood to increase the moisture content of the first wetted acetylated wood, the moisture introduced in the second introducing of the moisture being steam at a temperature in the range of 170° C. to 210° C., the second introducing of the moisture being carried out in a digester, wherein the receptacle and the digester are different from one another, and wherein a seal is maintained between the receptacle and the digester;

after the moisturizing of the acetylated wood, comminuting the moisturized acetylated wood into the acetylated wood fibre;

coating the comminuted and moisturized acetylated wood fibre with a binder; and drying the coated acetylated wood fibre to have a moisture content from 5% w/w to 8.5% w/w, wherein the comminuting of the moisturized acetylated wood comprises breaking down pieces of the moisturized acetylated wood into the acetylated wood fibre.

2. The process of claim 1, wherein the coated acetylated wood fibre is dried to have a moisture content of 5% w/w to 8% w/w.

3. The process of claim 1, wherein the coated acetylated wood fibre is dried to have moisture content from 5.5% w/w to 7.5% w/w.

4. The process of claim 1, wherein the coated acetylated wood fibre is dried to have a moisture content of 6.5% w/w to 6.8% w/w.

5. The process of claim 1, wherein the first introducing of moisture in water and steam form heats the acetylated wood.

6. The process of claim 5, wherein the steam is introduced to the acetylated wood at a temperature in the range of 175° C. to 180° C.

7. The process of claim 5, wherein the steam is introduced to the acetylated wood at a temperature of 180° C.

8. The process of claim 1, wherein the second introducing of moisture heats the first moisturized acetylated wood.

9. The process of claim 8, wherein the steam is introduced at a temperature in the range of 180° C. to 200° C.

10. The process of claim 8, wherein the steam is introduced at a temperature of 190° C.

11. The process of claim 1, wherein said pieces of the moisturized acetylated wood are wood chip.

12. A process for forming acetylated wood fibre to manufacture fibreboard, the process comprising:

moisturizing acetylated wood, comprising:

first moisturizing the acetylated wood in a receptacle containing pieces of the acetylated wood to increase a moisture content of the acetylated wood by introducing moisture in water form and in steam form; and second moisturizing the first moisturized acetylated wood by introducing moisture to the first moisturized acetylated wood to increase the moisture content of the first moisturized acetylated wood, the moisture introduced in the second moisturizing of the first moisturized acetylated wood being steam at a temperature in the range of 170° C. to 210° C., the second moisturizing being carried out in a digester, wherein the receptacle and the digester are different from one another and a seal is maintained between the receptacle and the digester;

comminuting the second moisturized acetylated wood into the acetylated wood fibre;

coating the comminuted and moisturized acetylated wood fibre with a binder; and drying the coated acetylated wood fibre to have a moisture content from 5% w/w to 8.5% w/w.

13. The process of claim 12, wherein the receptacle is a holding receptacle configured to feed the acetylated wood for further processing.

14. The process of claim 13, wherein the holding receptacle is a surge control receptacle configured to consistently feed the acetylated wood for further processing.

15. A process for forming an article from acetylated wood fibre, said process comprising:

moisturizing acetylated wood, wherein moisturizing acetylated wood comprises:

i) first wetting the acetylated wood by introducing moisture in water form and in steam form, the first wetting being carried out in a receptacle; and ii) after the first wetting, second introducing of moisture to the first wetted acetylated wood to increase the moisture content of the first wetter acetylated wood, the moisture introduced in the second introducing of the moisture being steam at a temperature in the range of 170° C. to 210° C., the second introducing of the moisture being carried out in a digester, wherein the receptacle and the digester are different from one another, and wherein a seal is maintained between the receptacle and the digester;

after the moisturizing of the acetylated wood, comminuting the moisturized acetylated wood into the acetylated wood fibre;

coating the comminuted and moisturized acetylated wood fibre with a bonding agent; and forming the article by drying the coated acetylated wood fibre to bond the dried acetylated wood fibre with the bonding agent, wherein the dried acetylated wood fibre has a moisture content from 5 w/w to 8.5%.

16. The process according to claim 15, wherein the article is a fibreboard.

17. The process of claim 15, wherein said bonding agent is a resin.

* * * * *